Dec. 28, 1943.  E. G. BUSSE  2,337,708

BRAKE GEAR SUPPORT

Filed Jan. 15, 1943

INVENTOR:
EDWIN G. BUSSE
BY Rodney Bedell
ATTORNEY

Patented Dec. 28, 1943

2,337,708

UNITED STATES PATENT OFFICE 2,337,708

BRAKE GEAR SUPPORT

Edwin G. Busse, Chicago, Ill., assignor to Chicago Railway Equipment Company, Chicago, Ill., a corporation of Illinois Application January 15, 1943, Serial No. 472,489

9 Claims. (Cl. 188—210)

The invention relates to support devices such as are applied to a railway truck main part to support, safeguard or guide the adjacent brake beams or other brake gear.

A simple illustrative embodiment of the invention such as illustrated in the accompanying drawing comprises a bracket secured to the bottom of a truck spring plank and an angle iron spring-supported in the bracket and extending in opposite directions to underlie the brake beams at opposite sides of the spring plank. However, the arm could be spring-supported on the truck bolster or on an extension of the truck side frame or other truck part.

Devices of this general type are shown in patents to C. H. Williams, 1,199,955, issued October 3, 1916, and to the present inventor, 1,701,945, issued February 12, 1929. Each of these patented devices includes a spring between the bracket and a support arm to thrust the support arm upwardly. In the Williams patent a coil spring is used at each end of the bracket and each coil spring functions substantially independently of the other spring to support the portion of the arm immediately over the spring. In the Busse patent a flat spring has a single point of support intermediate the ends of the bracket and has spaced points engaging the arm. Each half of the spring functions substantially independently of the other half. In both of these patented devices, the support arm is notched or apertured to receive a securing member, preventing the movement of the arm longitudinally of the truck and out of the bracket.

One object of the present invention is to reduce or eliminate failures in the support arms by avoiding concentration of fatigue stresses, and this is done by supporting the arm with spring elements spaced longitudinally of the arm and cooperating in supporting the arm irrespective of the point or points of application of load to the arm. Preferably, the notching or perforation of the arm is eliminated and other means are provided for holding the arm against movement through the bracket longitudinally of the truck.

Another object of the invention is to lighten the spring structure by equalizing to all of the spring elements any load applied to the arm.

These and other detail objects of the invention as will appear below are attained by the structure illustrated in the accompanying drawing, in which—

Figure 1:
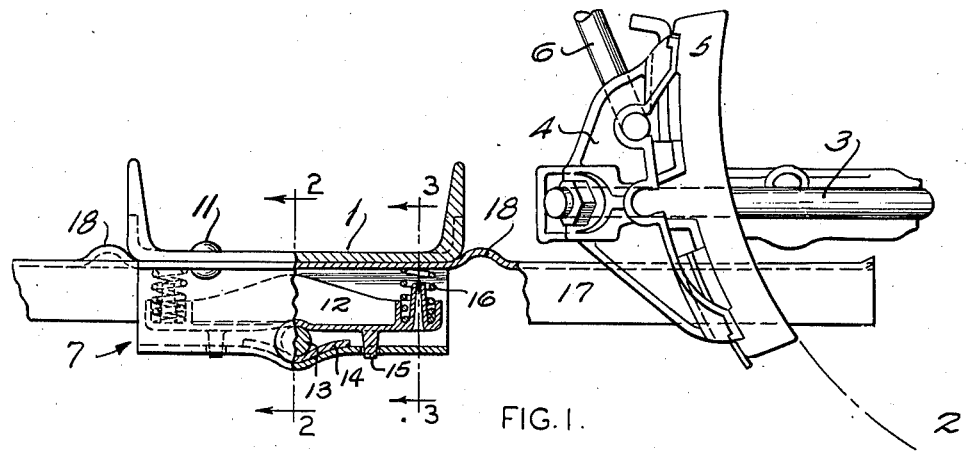
Figure 1 is in part a side elevation of the support structure and a wheel and brake gear with which it is associated and in part a section through portions of the support structure.
Figure 2:
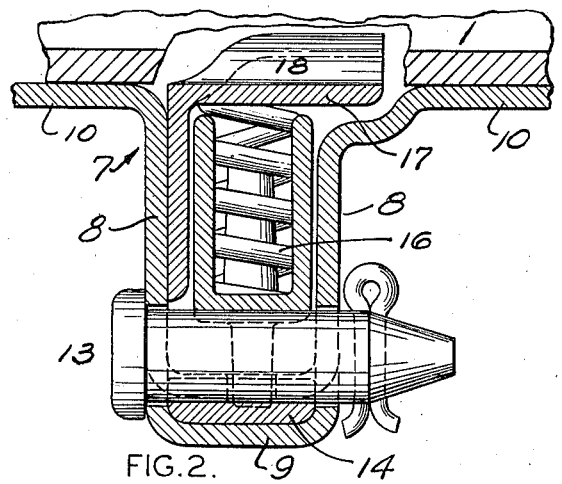
Figures 2 and 3 are vertical sections taken on the corresponding section lines of Figure 1 and drawn to an enlarged scale.
Figure 3:
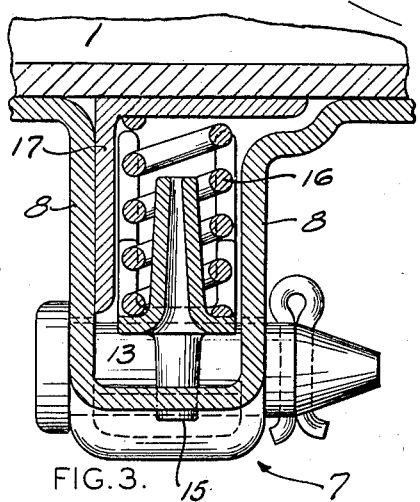
Figure 4:
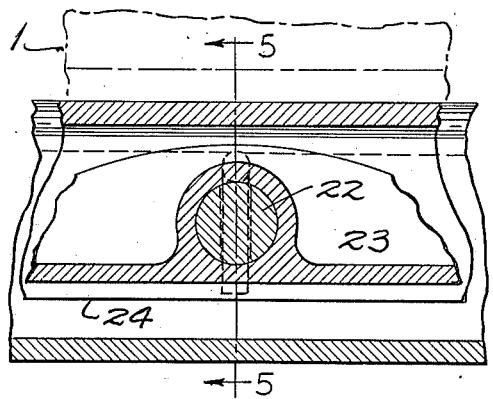

Figure 4 corresponds to the portion of Figure 1 showing the central part of the support structure, but drawn to an enlarged scale, and illustrating a modification.

Figure 5:
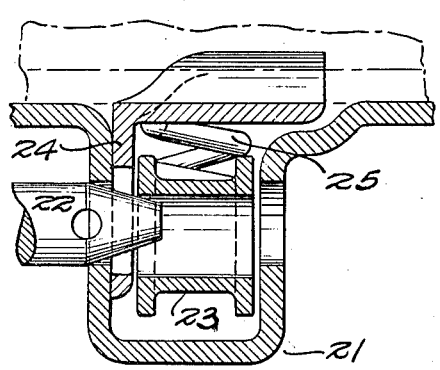

Figure 5 is a vertical section taken on the line 5—5 of Figure 4.

1 indicates the channel spring plank of an ordinary four-wheel truck, one of the wheels being indicated at 2. An associated brake beam, indicated at 3, is provided with a brake head 4 and a shoe 5 for application to the wheel. The brake beam and the parts carried thereby are normally suspended by a hanger 6 from a bracket on the truck frame (not shown) which also carries the spring plank 1.

A U-shaped bracket 7 is secured to the underside of the spring plank and comprises upright sides 8 and a horizontal bottom wall 9, the upright sides having flanges 10 whereby the bracket is riveted to the spring plank, as indicated at 11. A substantially rigid equalizer member 12 is received between the sides of the bracket and is pivotally supported intermediate its ends by a pin 13 extending through the apertures in bracket sides 8. Preferably pin 13 is seated upon a renewable bearing 14 of any suitable material resting on the bracket bottom wall 9. Lugs 15 depending from member 12 are loosely received in apertures in the bracket bottom wall and hold member 12 against movement longitudinally of the bracket irrespective of the presence of pin 13.

Coil springs 16 are seated on the end portions of member 15, and an angle iron 17 is loosely received in the bracket where it is supported by springs 16 and extends longitudinally of the truck to underlie the adjacent brake beams. Preferably the horizontal leg of support arm 17 is crimped, as indicated at 18, to engage the sides of the spring plank to hold the arm against movement longitudinally of the truck when in its normal position.

Obviously, the pivotally mounted member 12 constitutes a flexible device between the bracket and the support arm cooperating with the springs to break up the concentration of fatigue stresses which would otherwise likely occur because of the blows applied to the arm through the brake gear as the result of flat wheels, rail joints and other track inequalities, the torque resulting from application and release of the brakes, etc. Obviously any load on one end of arm 17, exceeding that applied to the other end of the arm, which would tend to compress the adjacent spring, will be equalized into the more remote spring. Hence the springs may be of lighter construction than would be the case if each one were designed to sustain all of the load applicable to the adjacent end of the arm.

By continuing the lower edge of the vertical leg of the angle iron support arm in a straight line instead of notching the same to be engaged by the supporting pin, as in the above-mentioned Busse patent, the tendency of the arm to fracture at the notched portion is eliminated. In the event of the loss of pin 13, the bar will not slide out of the bracket because the dropping of member 12 will be partially compensated by the expansion of springs 16 and the bar crimps 18 will still engage the spring plank. These crimps will not interfere with the assembly of the bar with the bracket structure prior to the insertion of pin 13. After the bar is inserted, one or both ends of member 12 may be elevated to permit the insertion of the tapered end of pin 13 which, when driven home, will support the equalizer in raised position and bring desired pressure on the arm.

Figures 4 and 5 illustrate another form of the invention in which the bracket 21 corresponds to that previously described, but the holding pin 22 passes through the bracket sides at a higher level than does pin 13 and is seated in the sides of the bracket instead of being seated upon the bottom of the bracket, as is the pin 13. To accommodate this arrangement, the equalizing member 23 and the support arm 24 have transverse apertures for receiving pin 22 and the pin secures the equalizer and the arm against movement longitudinally of the bracket. Arm 24 is not pivoted on pin 22 but is supported from the equalizer by springs 25 spaced longitudinally of the arm. Hence the general arrangement and functioning of the device is similar to that of the device previously described and possesses similar advantages over the prior art. The provision of an aperture between the top and bottom of the vertical leg of the angle iron support arm is less likely to result in fracture of the arm at this point than a notch in the lower edge of the arm.

The details of the structure may be varied otherwise than as described without departing from the spirit of the invention and the exclusive use of those modifications coming within the scope of the claims is contemplated.

What is claimed is:

1. In a device for supporting railway brake gear, a bracket for attachment to a truck main part, an elongated arm extending through the bracket and beyond the same to underlie brake gear at both ends of the bracket, separate springs spaced apart longitudinally of the arm and supporting the arm from the bracket, and means equalizing the load applied to either end of the arm to both of said springs.

2. In a device for supporting railway brake gear, a bracket for attachment to a railway truck main part, a horizontally disposed elongated arm extending over the bracket and beyond the same to underlie the brake gear, an elongated rigid member extending over the bracket substantially parallel to said arm, springs spaced longitudinally of the arm and carried by said member at spaced points and supporting said arm, and an element intermediate the springs pivotally supporting said member on the bracket.

3. In a device for supporting railway brake gear, an elongated bracket of U-shaped cross section arranged for attachment to the underside of a railway truck main part, an arm extending through the bracket and outwardly therefrom to underlie brake gear, a substantially rigid member extending generally parallel to and beneath the arm and between the legs of the bracket, springs carried on said member near its ends and yieldingly supporting the arm, and an element seated in the bracket and pivotally supporting said member intermediate said springs.

4. In a device for supporting railway brake gear, an elongated open end bracket of U-shaped cross section arranged for attachment to the underside of a railway truck main part, an arm extending through the bracket and outwardly therefrom to underlie the brake gear, a substantially rigid member extending generally parallel to and beneath the arm and between the legs of the bracket and having depending elements loosely received in recesses in the bottom of the bracket to hold said member against movement longitudinally of the bracket, springs seated on the end portions of said member and yieldingly supporting the arm, and a pin extending transversely through said bracket beneath said member and pivotally supporting the latter intermediate the springs.

5. In a device for supporting railway brake gear, an elongated bracket of U-shaped cross section arranged for attachment to the underside of a railway truck main part, an arm extending through the bracket and outwardly therefrom to underlie the brake gear, a substantially rigid member extending generally parallel to and beneath the arm and between the legs of the bracket, springs carried on said member near its ends and yieldingly supporting said arm, there being aligned transverse apertures in the bracket and member intermediate the springs, and a pin seated in said apertures and pivotally mounting said member on the bracket.

6. In a device for supporting railway brake gear, an elongated bracket of U-shaped cross section arranged for attachment to the underside of a railway truck main part, there being horizontally extending apertures through the upright sides of the bracket and a vertically extending aperture through the horizontal bottom wall of the bracket, an arm extending through the bracket and outwardly therefrom to underlie brake gear, a substantially rigid member extending generally parallel to and beneath the arm and between the sides of the bracket, springs carried on said member near its ends and yieldingly supporting the arm, a pin inserted through said apertures in the upright sides of the bracket and engaging the bottom of said member intermediate said springs and elevating the same above the horizontal bottom wall of the bracket to compress said springs and thereby thrust the arm against said truck part, and an element on said member projecting downwardly through the aperture in the horizontal bottom wall of the bracket to prevent movement of said member lengthwise of the bracket irrespective of the presence of said pin.

7. In combination, in a railway truck, a truck main part, a brake gear support arm extending longitudinally of the truck with its upper face engaging downwardly facing elements on said truck part spaced apart longitudinally of the arm, springs supporting the arm at points spaced apart longitudinally of the arm, a substantially rigid member supporting the springs, and a device carried by said truck part and pivotally supporting said member intermediate the springs so that a load on one end of the arm will cause the arm to pivot on the truck part element nearer the other end of the arm and said member will tilt on said device to equalize the compression of the springs.

8. In combination, in a railway truck, a truck spring plank, a brake gear support arm extending longitudinally of the truck beneath said spring plank, a device secured to said spring plank and underlying the arm, a lever extending generally parallel to and beneath said arm, means pivotally mounting the lever on said device and holding them against relative movement longitudinally of the truck, springs on said lever spaced apart longitudinally of said lever and at opposite sides of the pivoted mounting of said lever and thrusting the arm against the bottom of the spring plank, the arm and spring plank having opposing elements holding the arm against movement longitudinally of the truck and the member.

9. In a device for supporting a railway brake gear, an elongated bracket of U-shaped cross section arranged for attachment to the underside of a railway truck part, there being horizontally extending apertures through the upright sides of the bracket, an arm extending through the bracket and outwardly therefrom to underlie brake gear, a substantially rigid member extending generally parallel to and beneath the arm and between the sides of the bracket, springs carried on said member near its ends and yieldingly supporting the arm, a pin inserted through said apertures in the upright sides of the bracket and engaging the bottom of the member intermediate said springs and elevating the same above the horizontal bottom wall of the bracket to compress said springs and thereby thrust the arm against said truck part, and a renewable wear element seating said pin in said bracket.

EDWIN G. BUSSE.